United States Patent [19]

Lo

[11] Patent Number: 5,836,673
[45] Date of Patent: *Nov. 17, 1998

[54] STRIP SPORT LIGHT

[76] Inventor: Robin Lo, 12309 Terrence Ave., Saratoga, Calif. 95070

[ * ] Notice: The term of this patent shall not extend beyond the expiration date of Pat. No. 5,667,294.

[21] Appl. No.: 783,497

[22] Filed: Jan. 14, 1997

Related U.S. Application Data

[63] Continuation-in-part of Ser. No. 289,657, Aug. 12, 1994, Pat. No. 5,667,294.

[51] Int. Cl.⁶ ....................................... F21V 23/04
[52] U.S. Cl. .......................... 362/251; 362/103; 362/105; 362/106; 362/800
[58] Field of Search ...................... 362/103, 104, 362/105, 108, 234, 250, 251, 106, 800, 806

[56] References Cited

U.S. PATENT DOCUMENTS

| | | | |
|---|---|---|---|
| 2,721,257 | 10/1955 | Knox | 362/108 |
| 3,676,664 | 7/1972 | Corvetti | 362/105 |
| 4,254,451 | 3/1981 | Cochran, Jr. | 362/103 |
| 5,434,759 | 7/1995 | Endo et al. | 362/108 |
| 5,535,106 | 7/1996 | Tangen | 362/108 |
| 5,667,294 | 9/1997 | Lo | 362/250 |

*Primary Examiner*—Stephen F. Husar
*Attorney, Agent, or Firm*—The Kline Law Firm

[57] ABSTRACT

A strip sport light including a central body and two side strips with multiple electrical light sources for illumination and blinking. Each side strip has one or more distributed electrical energy sources each enclosed in an aerodynamic housing, and multiple electrical light sources distributed along the length of the side strip. The central body contains an electronic printed circuit board, a three-step push button switch, and multiple electrical light sources. The strip sport light may be mounted on a bicycle helmet or worn on a user's head or waist for enhanced safety.

4 Claims, 3 Drawing Sheets

STRIP SPORT LIGHT

BACKGROUND OF THE INVENTION

This is a continuation-in-part of Applicant's U.S. application Ser. No. 08/289,657, filed Aug. 12, 1994, now U.S. Pat. No. 5,667,294.

The present invention relates to a safety flashlight, and more particularly to an illumination and safety flashlight having a thin and flexible strip-like elongated profile.

Flashlights or electrical torch lights serve illumination purposes for users. Typically, a flashlight has a rigid body which includes a light bulb and one or two batters cells. A manual ON/OFF switch turns "on" or "off" the flashlight to cause it to emit light when desired.

Some flashlights can generate a blinking light to attract the attention of nearby people or vehicles. Due to the rigid and irregular body shape of traditional flashlights, they can be easily carried by hand or mounted on a bicycle. Unfortunately, such flashlights are hard to mount on the helmet of a bicycle rider or to wear on the head of a jogger. Further, a centralized blinking light source can be easily blocked by the helmet body or by the jogger's head, which makes the light difficult to see.

Although traditional rigid flashlights have various advantages such as utility and low price, they are not without drawbacks for certain applications. Thus, there exists a need for a new type of flashlight that can be easily mounted on the helmet of a bicycle rider or that can be worn on the head of a jogger and still serve both illumination and safety purposes.

SUMMARY OF THE INVENTION

The present invention provides a flexible strip-like elongated light to serve both illumination and safety purposes. A central body houses an electronic circuit board which has a three-step push button switch and several illumination light sources directly mounted on it. The light sources and the switch are exposed to the outside of the central body housing. The switch has the following three setting positions: "ON", "OFF" and "BLINK". The illumination light sources can be turned on by setting the switch to the "ON" position. It can also be turned off by setting the switch to the "OFF" position When the switch is setting to the "BLINK" position, all the light sources will start blinking.

The two side strips are mechanically and electrically very similar to each other. The side strip body is made of a soft material, so that it is flexible. Each side strip body houses one or more electrical energy sources and has several light sources distributed along its length. The energy sources and the light sources of both side strips are electrically connected to the light sources and the three-step push button switch of the central body.

When the switch is set to the "BLINK" position, these light sources on the side strips start blinking. These distributed blinking lights, if mounted properly on a bicycle driver's helmet, or worn on the head of a jogger, will catch the attention of the drivers of the surrounding vehicles. The blinking lights normally will not be blocked by the helmet body or by the jogger's head. Preferably, the light sources on the side strips are colored—and more preferably they are made of LED's (Light Emitting Diodes).

The preferable electrical energy sources are commonly used commercial dry cell batteries. In the preferred embodiments, the electrical energy sources are size "AAA" or "AA" dry cell batteries.

A further understanding of the nature and advantages of the invention will become apparent by reference to the remaining portion of the specification and drawings.

DESCRIPTION OF SPECIFIC EMBODIMENTS

Figure 1:
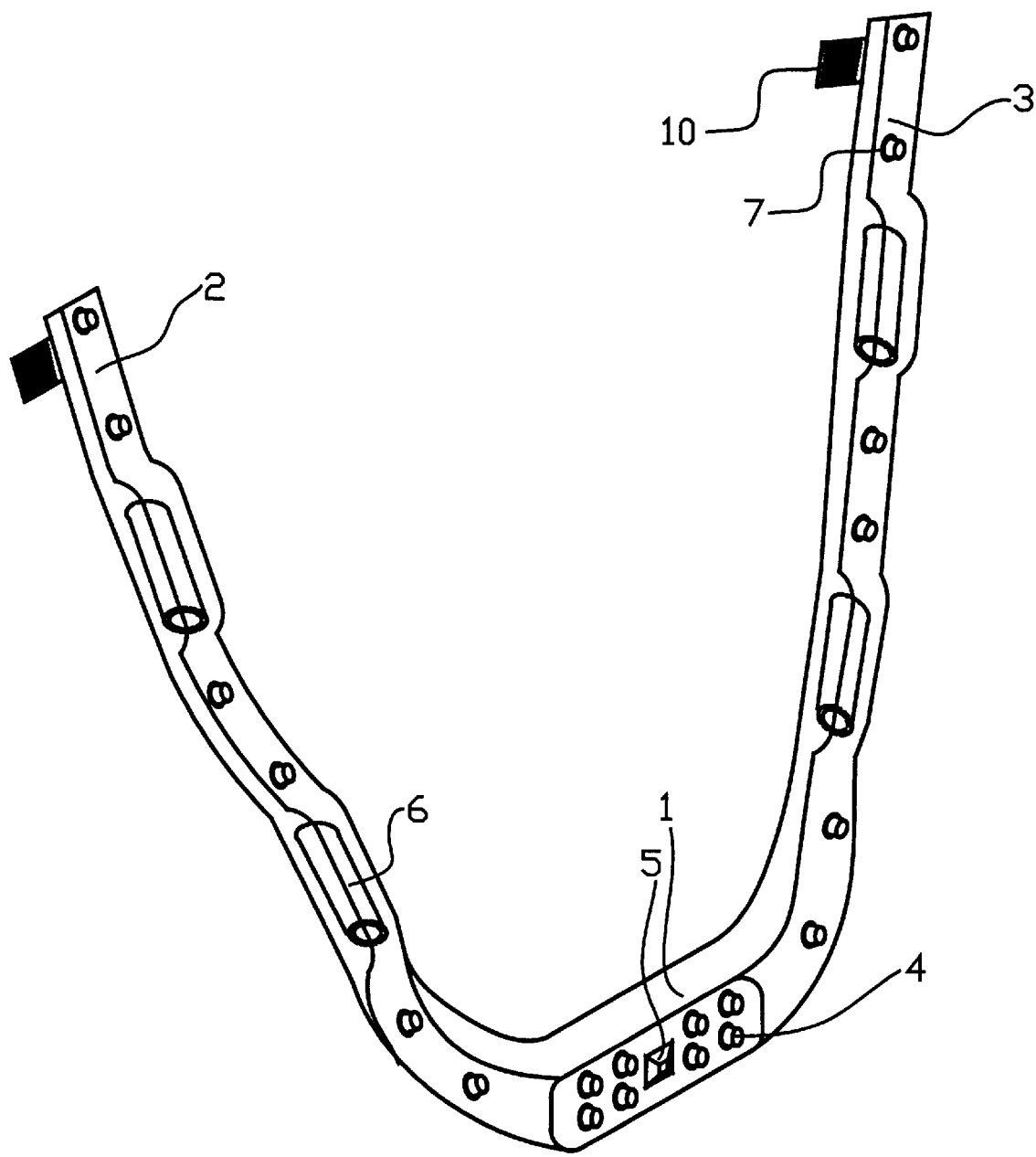
FIG. 1 shows a perspective view of a strip sport light according to the present invention.

Referring to FIG. 1, a strip sport light of the present invention includes a central body 1, a left side strip 2 and a right side strip 3. The central body 1 includes several illumination light sources 4 and a multiple position switch 5. On the left side strip, a dry cell battery 6 is enclosed in an aerodynamically designed battery housing. Several safety lights sources 7 are shown on the right side strip 3. A fastening means 8, a "hook and loop" fastener in the preferred embodiment, is also shown on an end portion of each side strip body 2, 3 to provide an easy head mounting fastening method.

Preferably, the housing of the central body and side strips is made from a soft material that provides flexibility for better attachment to a helmet surface. In preferred embodiments, the housing of the central body and the side strips will be made from PVC or rubber, but a variety of other suitable materials may be used.

The side strip length (distance from the central body to the free end) is preferably long enough to fit any standard bicycle helmet. In preferred embodiments, the length of the side strip is between 10 and 15 inches. The side strip average width is preferably between 0.25 inch to 0.75 inch.

The central body length (distance from left end to the right end) is preferably between 2 and 3 inches. The central body width (distance from top edge to bottom edge) is preferably between 0.5 inch to 1.5 inch.

The switch 5 operates in three modes: (1) Illumination Mode—When the switch is set to the "ON" position, it will turn on the light sources on the central body and/or light sources on both side strips. (2) Blinking Mode—When the switch is set to the "BLINK" position, all the light sources on both side strips and/or on the central body will start blinking. (3) Off mode—When the switch is set to the "OFF" position, all light sources will be turned off. The switch 5 can be mounted at any convenient position on the side strips or the central body.

It is recognized that any combination of color, size, and number of light sources may be utilized for both the illumination and blinking functions.

Preferably, illumination light sources 4 on the central body 1 will be an array of light emitting diodes (LED's), but may also be a lamp(s) or other conventional light sources. The preferred LED color for the central body is yellow or green. In a preferred embodiments, the number of illumination LED's will be between 2 and 10.

The distributed light sources on the side strips 7 are provided for safety purpose. These light sources will flash on and off while switch 5 is setting on the "BLINK" position. Preferably, safety light sources 7 on both side strips 2, 3 will be an array of light emitting diodes (LED's), but may also be a lamp(s) or other conventional light sources. The preferred LED colors are red, or orange. The LED's may be all in a single color, or may be several colors. In preferred embodiments, the number of safety light sources on each side strip will be between 1 and 10.

Figure 2:
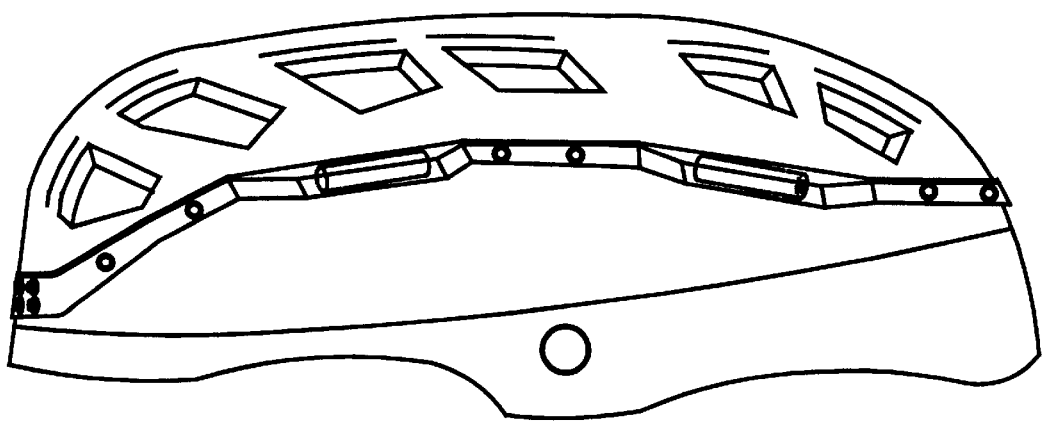
FIG. 2 shows a side view of a strip sport light mounted on a bicycle helmet.

FIG. 2 shows a side view of a strip light mounted on a bicycle helmet. Preferably, the method of attachment of the strip light and the helmet surface is double-sided glue tape. In other preferred embodiments, "hook and loop fasteners" will be used for removable attachment between the strip light and the helmet.

Electrical energy source 14 is enclosed in an aerodynamic housing 15 of the side strips. In preferred embodiments, the electrical energy source will be either "AAA" or "AA" sized industrial standard dry cell batteries.

Figure 5:
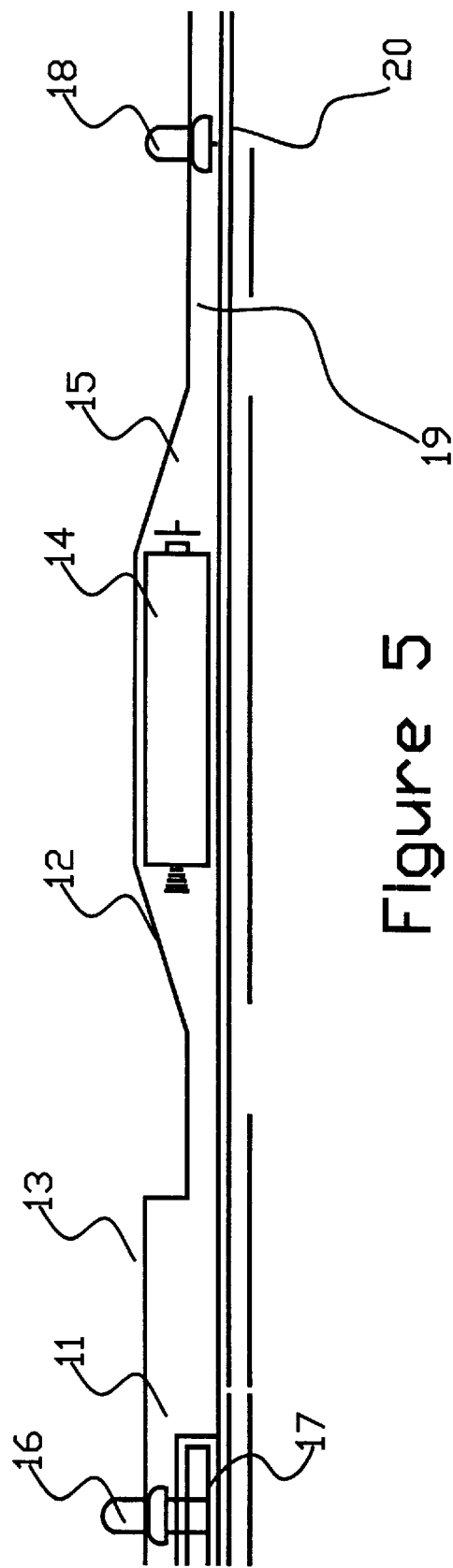
FIG. 5 shows a perspective side view of the juncture of the central body and the right side strip.

Illumination light source 16 mounted on an electronic printed circuit board (PCB) 17 is also shown in FIG. 5.

Figure 6:
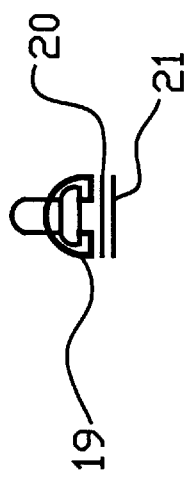
FIG. 6 shows the cross-sectional view of an LED light source in the side strip body.

FIG. 6 shows the cross-sectional view of a safety blinking light source 18 that is mounted in the side strip body 19. The side strip is also equipped with a loop fastener 20 and a hook fastener 21 to provide an easy and removable attachment of the strip sport light to a bicycle helmet.

Figure 3:
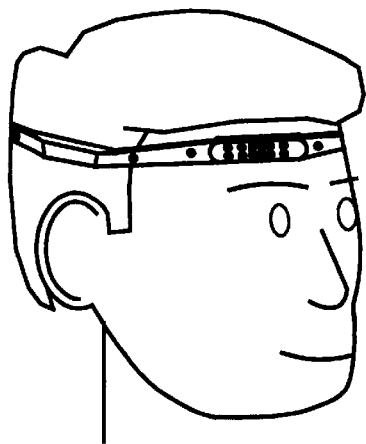
FIG. 3 shows a front view of a head mounted strip sport light.
Figure 4:
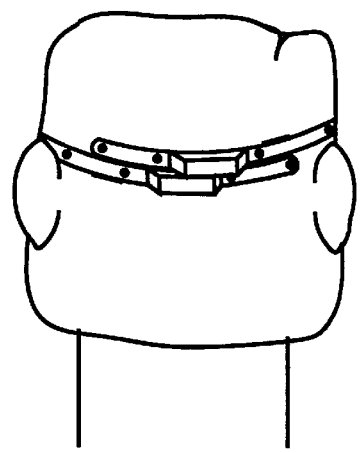
FIG. 4 shows a back view of a head mounted strip sport light.

For head mounting applications, loop fastener 20 of each side strip can be fastened to the hook fastener 10 (see FIG. 1) of the other side strip to secure the strip sport light on a user's head (see FIG. 3 and FIG. 4).

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. A safety strip sport light comprising:

an elongated housing formed from a single piece of flexible material that comprises a central body, a first side strip body, and a second side strip body;

said central body comprises an electrical control switch, at least one light source, and an electronic printed circuit board, and said first side strip comprises a first end portion of said elongated body housing and said second side strip comprises a second end portion of said elongated body housing, each said side strip includes at least one electrical energy source, at least one light source, and an element of a fastening means; and wherein said printed circuit board electrically connects said energy sources with said electrical control switch and said light sources on said central body and said side strip bodies such that said electrical control switch performs the following three functions:

(a) illumination—at least one of said light sources is turned on;

(b) blinking—multiple light sources flash on and off;

(C) shut off—all said light sources are turned off;

said side strips each contain an element of a hook-and-loop fastener, such that said side strips are detachably connected to each other, thereby facilitating the attachment of said strip sport light onto an object chosen by a user; and wherein said electrical control switch is electrically connected to said light sources, said switch triggering an illuminating function and a blinking function wherein at least one of said light sources blinks on and off while said blinking function is activated.

2. The strip sport light of claim 1 wherein:

said light sources are LED's.

3. A strip sport light comprising:

a central body including an electronic printed circuit board, a switch, at least one light source, and two side strip bodies, each said side strip body including at least one electrical energy source, a plurality of light sources, and an element of a fastening means;

wherein said central body and said side strip bodies are contained in a single elongated flexible housing.

4. The strip sport light of claim 3 wherein:

said light sources are LED's.

* * * * *